United States Patent Office 3,097,138
Patented July 9, 1963

1

3,097,138
ANTIVIRAL BIPHENYLYL GLYOXAL PROCESS
AND DOSAGE FORMULATIONS
Guido Cavallini and Elena Massarani, Milan, Italy, assignors to Francesco Vismara S.p.A., Casatenovo Brianza, Como, Italy, a firm
No Drawing. Filed July 26, 1960, Ser. No. 45,281
Claims priority, application Italy Mar. 15, 1960
6 Claims. (Cl. 167—65)

This invention relates to chemotherapeutic compositions containing sufficient quantities of aromatic glyoxal derivatives to exhibit activity against viral infections.

These compositions are active antivirals either as curative or, especially, as prophylactic or preventive agents. The viral infections against which these compositions variously have activity are distemper virus, influenza virus ($PR_8$), hepatitis virus ($MHV_3$), neurotropic virus (CLM), herpes simplex, adenovirus, Newcastle disease virus, coxsackie virus, Echo virus and hemadsorption virus. Activity against distemper and influenza infections is pronounced. Coupled with this antiviral activity is a low order of toxicity which enables free prophylactic use of the compositions.

The active chemical ingredients in the pharmaceutical compositions are represented by the following structural formula:

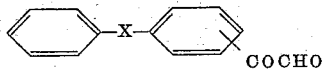
COCHO in which X is oxygen, sulfur, sulfonyl ($SO_2$), sulfinyl (SO), methylene ($CH_2$), ethylene (—$CH_2CH_2$—), vinylene (CH=CH) or a single valence bond.

Preferably, the active chemical ingredient is the para-substituted glyoxal derivative. Exemplary of the most active compounds of this invention are 4-phenoxyphenylglyoxal and p-diphenylglyoxal.

While the glyoxal parent compounds can be used in the composition of this invention, various addition products are freely substituted, such as alkali metal bisulfite addition compounds, for example the sodium or potassium bisulfite, the hydrates or alcoholate addition compounds with a simple alcohol such as the methyl alcoholate, the ethyl alcoholate, isopropyl alcoholate, etc. In general, the hydrocarbon-derived alcohol portion of such alcohol-addition products will not contain more than 12 carbon atoms.

The chemical ingredients described above are prepared from the known acetyl intermediates either by direct oxidation to glyoxals using selenium dioxide or preferably by dichlorination using chlorine gas then reacting the dihalogen intermediate with alkali, such as a metal alcoholate, to form the desired glyoxal. The addition products described above are formed in conventional manner by reacting the parent glyoxal with water, bisulfite or alcohol. The acetyl intermediates which may be unknown are prepared by methods similar to those already described in the literature, such as the Friedel-Crafts reaction.

The compositions of this invention are of great value in treating viral infections as described herebefore in sundry animal organisms. The treatment is by administering locally or internally, preferably orally, compositions containing from about 100 mg.–3 g. daily usually on a divided dosage regimen. Dosage units of about 50–600 mg., preferably 100–300 mg., are of utility administered as desired by the treating doctor. In applying the compositions to various sized animals generally doses of from about 10–200 mg., preferably 40–100 m., per kilogram are used.

As an example of the practical prophylactic use of the compositions of this invention is the treatment of laboratory mice or other animals which might be accidentally exposed to a viral organism such as influenza. In the curative area the compositions are administered orally to dogs afflicted with distemper. Also, the compositions can be administered in the feed of poultry as a preventative against Newcastle disease.

The pharmaceutical carrier may be, for example, either a solid or a liquid. Exemplary of solid carriers are talc, cornstarch, lactose, ethylcellulose, magnesium stearate, agar, pectin, stearic acid, gelatin and acacia. Exemplary of liquid carriers are water, peanut oil, olive oil and sesame oil. Solid carriers are preferred.

A wide variety of pharmaceutical forms can be employed. Thus, if a solid carrier is used, the preparation may be in the form of a soft gelatin capsule or placed in an ampul. The amount of carrier will vary widely but preferably will be from about 25 mg. to about 1 gm. If a sustained release preparation is employed the dosage regimens disclosed herein can be modified accordingly.

The compositions of this invention may be varied widely, such as by simple substitution on the phenyl rings by halogen atoms, nitro groups, hydroxy groups and acetamido groups, but the description above and the following examples will make all aspects of this invention obvious.

Example 1

A solution of 19.6 g. of 4-acetylbiphenyl in 260 ml. of glacial acetic acid is prepared and cooled to 50° C. Chlorine gas is bubbled into the mixture for one hour. The mixture is treated with water and extracted with methylene chloride. The combined organic extracts are dried, then evaporated. The residue is recrystallized to give crystalline 4-dichloroacetyldiphenyl, M.P. 93–94° C.

A solution of 2.3 g. of metallic sodium in 50 ml. of methanol is added to a solution of 13.25 g. of the dichloroacetyl intermediate in 150 ml. of anhydrous methanol. After two hours at 45–50° C., the alkalinity is neutral to phenolphthalein indicating that the reaction is complete. The salt is removed by filtration. The resulting filtrate is evaporated. The residue is taken into acetic acid at 50° C. After treatment with carbon black, the acid solution is heated while 5 ml. of 3% sulfuric acid and water is added to complete the precipitation. The mixture is cooled. The filtered solid is washed with water and recrystallized from ethanol to give diphenyl-4-glyoxal hydrate, M.P. 119–121° C.

This material (200 mg.) is mixed with 50 mg. of talc and filled into hard gelatin capsules which are administered orally from 2 to 4 times daily.

The alcoholate (250 mg. M.P. 84–86° C., prepared by reacting the free glyoxal with ethanol) is mixed with lactose (50 mg.) and filled into hard gelatin capsules.

Diphenyl-4-glyoxal (150 mg.) is mixed with 100 mg. of talc and filled into hard gelatin capsules.

A solution of 1 g. of diphenyl-4-glyoxal in 150 ml. of 95% ethanol is treated with 5 ml. of a saturated aqueous solution of pure sodium bisulfite free from sodium sulfate. The mixture is diluted with 75 ml. of water, stirred and allowed to stand overnight. The separated product is the sodium bisulfite hydrate addition product which (175 mg.) is mixed with 125 mg. of lactose and filled into hard gelatin capsules.

Example 2

A solution of 11.2 g. of 4-phenoxyacetophenone in 100 ml. of glacial acetic acid is prepared and chlorinated as in Example 1. The resulting dichloro compound melts at 67–69° C. This compound (6 g.) in anhydrous methanol is treated with a solution of 1.2 g. of sodium in 50 ml. of methanol at 45° C. as in Example 1 to give 4-phenoxyphenyl-glyoxal hydrate, M.P. 84° C.

This compound (100 mg.) is combined with 150 mg. of lactose and encapsulated.

The hydrate is heated at 100° C. in vacuo to form the free glyoxal which is tableted into 250 mg. tablets.

4-phenoxyphenylglyoxal (1 g.) is heated briefly with 25 ml. of methanol to form the methylate which can be substituted for the above compounds. The potassium bisulfite compound is prepared as described in Example 1.

*Example 3*

A mixture of 16.8 g. of diphenylmethane, 20 g. of aluminium chloride and 100 ml. of carbon disulfide is treated with 7.1 g. of dichloroacetyl chloride. The reaction mixture is quenched with an acid-ice slurry then extracted with methylene chloride. The organic extracts are washed, dried and evaporated to give 4-dichloroacetyldiphenylmethane, M.P. 113° C.

This compound (5 g.) is reacted with potassium ethylate as in Example 1 to give crude 4-benzylphenylglyoxal from ethyl acetate. The crude glyoxal (1 g.) is reacted with an excess of pure potassium bisulfite in ethanol to give the potassium bisulfite addition product.

This compound (250 mg.) is mixed with a carrier and filled into a hard gelatin capsule.

*Example 4*

The reaction of Example 3 is run using 7.5 g. of dichloroacetyl chloride, 9.1 g. of diphenylethane, 10 g. of aluminum chloride in 50 ml. of carbon disulfide. The reaction mixture, worked up as described, gives upon vacuum distillation a fraction at 150–153° C. at 0.2 mm. pressure which crystallizes from petroleum ether, M.P. 51–52° C. This 4-dichloroacetyldiphenylenethane (3 g.) is reacted with sodium ethylate, as described, to give the corresponding glyoxal hydrate, M.P. 97–98° C.

This compound (300 mg.) is filled into hard gelatin capsules and administered orally 3–4 times daily.

*Example 5*

A mixture of 18 g. of stilbene, 20 g. of aluminum chloride, 15.1 g. of dichloroacetyl chloride and 100 ml. of carbon disulfide is reacted as described, 4-dichloroacetylstilbene is obtained by evaporating the organic extracts and recrystallizing the residue from petroleum ether. This compound (10 g.) is reacted with sodium methylate as described above to give the glyoxal as the hydrate, M.P. 144–145° C.

This hydrate (250 mg.) is mixed with lactose and filled into capsules.

*Example 6*

A mixture of 19.6 g. of diphenyl sulfide, 13.3 g. of aluminum chloride and 100 ml. of carbon disulfide is cooled to 5° C. At temperatures of 5–10° C., 14.74 g. of dichloroacetyl chloride is added. After five hours, the reaction mixture is quenched and extracted. Isolation by distillation gives dichloroacetyldiphenylsulfide, B.P. 170–180° C. at 0.2 mm., M.P. 67° C. This compound (10 g.) is converted to 4-phenylthiophenylglyoxal using sodium ethylate as described, M.P. 53–56° C. as the hydrate.

The hydrate (150 mg.) is mixed with 100 mg. of lactose and filled into capsules.

The hydrate (5 g.) is heated in a drying pistol in vacuo at 100° C. to give the free glyoxal. This compound (1 g.) is reacted with ethyl alcohol to form the alcoholate addition compound which (250 mg.) is mixed with 50 mg. of lactose and filled into capsules.

*Example 7*

A mixture of 12 g. of 2-phenoxyacetophenone in glacial acetic acid is chlorinated with chlorine gas to form the dichloro analogue. This compound is then reacted with sodium ethylate to give 2-phenoxyphenylglyoxal hydrate. This compound (100 mg.) is encapsulated in the usual manner.

*Example 8*

A mixture of 12.3 g. of 4-phenylsulfinylacetophenone, prepared by oxidizing the corresponding diphenylsulfide with a calculated amount of hydrogen peroxide, in 100 ml. of glacial acetic acid is chlorinated as described with chlorine gas in acetic acid to give 4-dichloroacetyldiphenylsulfoxide, M.P. 98° C. This material (8 g.) is reacted with sodium methylate as described to give the desired glyoxal hydrate, M.P. 126–128° C. The glyoxal (150 mg.) is mixed with 95 mg. of talc and 5 mg. of magnesium stearate, then encapsulated.

*Example 9*

A mixture of 20 g. of 4-acetyldiphenylsulfone, prepared by oxidizing 4-phenylsulfinylacetophenone with an excess of hydrogen peroxide at ambient temperature, and 200 ml. of acetic acid is held at 50° C. while chlorine gas is passed through for four hours. Working the mixture up as described gives 4-dichloroacetyldiphenylsulfone, M.P. 101–102° C. This compound (12 g.) is reacted with sodium methylate as described to give a crude residue of 4-phenylsulfonylphenylglyoxal hydrate. This crude material in ethanol is reacted with an excess of sodium bisulfite to form the sodium bisulfite addition product.

The bisulfite compound (250 mg.) is encapsulated and administered 4 times daily orally.

The 4-phenylsulfonylphenylglyoxalhydrate (5 g.) is heated at 78° C. in a vacuum drying pistol to give the free glyoxal. This compound (2 g.) is reacted with amyl-alcohol to form the amyl alcohol addition compound. This material (100 mg.) is mixed uniformly with 200 mg. of lactose and 50 mg. of starch. The mixture is wet granulated and compressed into a tablet.

*Example 10*

A solution of 5 g. of 4-dichloroacetyl-4-chlorodiphenylether, prepared by the Friedel-Crafts reaction with dichloroacetyl chloride, aluminum chloride, 4-chloro-diphenylether and carbon disulfide as described above, in acetic acid is reacted with sodium in absolute methanol by the procedure described to give 4-(p-chlorophenoxy)-phenyl-glyoxal hydrate, M.P. 110–111° C. This compound (100 mg.) is mixed with 100 mg. of lactose, 45 mg. of starch and 5 mg. of magnesium stearate then granulated with a sugar solution and tableted.

*Example 11*

A mixture of 6.1 g. of selenium dioxide in 20 cc. of 90% aqueous dioxane is heated to 60° C., while a solution of 12.8 g. of 4'-nitro-4-acetyldiphenylether (prepared by reacting acetyl chloride with 4-nitro-diphenylether under Friedel-Crafts conditions) in 100 cc. of dioxane is added dropwise. The mixture is heated at reflux for 5 hours, then filtered hot and evaporated to dryness in vacuo.

The residue consists of crude 4-(p-nitrophenoxy)-phenyl-glyoxal hydrate. This material is taken up with ethyl alcohol and treated with an aqueous solution of sodium bisulfite. After stirring vigorously at room temperature for 1 hour, the mixture is diluted with water and filtered, thus obtaining 8.1 g. of sodium bisulfite addition product.

This ingredient (150 mg.) is mixed with a solid carrier and filled into a soft gelatin capsule.

*Example 12*

5.7 g. of 4'-hydroxy-4-acetyl-diphenylether, prepared according to J. Walker (J. Org. Chem., 1942, page 351), is treated in dioxane solution with 2.9 g. of selenium dioxide as in Example 11. The mixture is refluxed for several hours, then filtered hot and cooled, 4-(p-hydroxyphenoxy)-phenyl-glyoxal hydrate separates, M.P. 121–122° C.

100 mg. of the compound is mixed with 100 mg. of lactose and 50 mg. of rich starch and the mixture granulated and compressed into a tablet. The hydrate (4 g.)

is reacted at 60° C. with an excess of methyl alcohol to give the methylate addition compound. This material (130 mg.) is mixed with 60 mg. of lactose, 60 mg. of talc and tableted in the usual manner.

Example 13

A solution of 13.5 g. of 4'-acetamido-4-acetyldiphenylether (obtained by the reduction of 4'-nitro-4-acetyldiphenylether, followed by acetylation under standard conditions) in 100 cc. of dioxane is heated with 6 g. of selenium dioxide as described above to give 4-(p-acetamidophenoxy)-phenylglyoxal hydrate, M.P. 133° C.

This material (250 mg.) is mixed with lactose and filled into capsules.

What is claimed is:

1. An antiviral composition in dosage unit form comprising a pharmaceutical carrier and from about 50 mg. to about 600 mg. of a chemical compound selected from the group consisting of: (1)

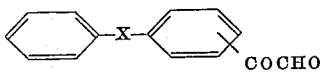

in which X is a moiety selected from the group consisting of oxygen, sulfur, sulfonyl, sulfinyl, methylene, vinylene, ethylene and a single valence bond; (2) its hydrate; (3) its alkali metal bisulfite; and (4) its alcoholate molecular addition compounds.

2. An antiviral composition in dosage unit form comprising a pharmaceutical carrier and from about 50 mg. to about 600 mg. of a chemical compound having the basic structure:

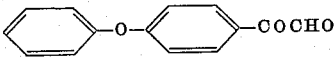

3. An antiviral composition in dosage unit form comprising a pharmaceutical carrier and from about 50 mg. to about 600 mg. of 4-phenoxyphenylglyoxal hydrate.

4. The method of combating viral infections in animal organisms infected with a virus selected from the group consisting of distemper virus, influenza virus (PR$_8$), hepatitis virus (MHV$_3$), neurotropic virus (CLM), herpes simplex, adenovirus, Newcastle disease virus, coxsackie virus, Echo virus and hemadsorption virus, comprising internally administering an antiviral of a composition containing a chemical compound selected from the group consisting of: (1)

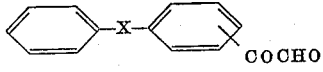

in which X is a moiety selected from the group consisting of oxygen, sulfur, sulfonyl, sulfinyl, methylene, vinylene, ethylene and a single valence bond; (2) its hydrate; (3) its alkali metal bisulfite; and (4) its alcoholate molecular addition compounds.

5. The method of claim 4 in which the chemical compound has the structure:

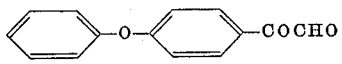

6. The method of claim 5 in which the chemical compound is 4-phenoxyphenylglyoxal hydrate.

References Cited in the file of this patent

UNITED STATES PATENTS

| | | |
|---|---|---|
| 2,889,243 | Underwood et al. | June 2, 1959 |
| 2,893,912 | Musser et al. | July 7, 1959 |
| 3,018,305 | Cavallini et al. | Jan. 23, 1962 |
| 3,036,131 | Cavallini et al. | May 22, 1962 |

OTHER REFERENCES

Bock et al.: "Antiviral Activity of Glyoxals," Nature, vol. 179, pages 706–707, Apr. 6, 1957.

Cavallini et al.: "The Concept of a Supporting Moiety as Applied to the Synthesis of Antiviral Compounds," J. Med. Pharm. Chem., vol. I, pp. 365–370, August 1959, abstracted in Chem. Abstracts, 54, #10133g.

Cavallini et al.: "Antiviral Compounds With Considerable Activity in Vivo. I. Biphenyl Derivatives," J. Med. Pharm. Chem., vol. I, pp. 601–608, December 1959, abstracted in Chem. Abstracts, 54, #16654e.

Cavallini et al.: "Antiviral Compounds II. Reaction of 4-Biphenylylglyoxal With PABA and Related Compounds," J. Med. Pharm. Chem., vol. 2, No. 1, pp. 99–106, February 1960, abstracted in Chem. Abstracts, 54, #18425e.

Coraggio et al.: "Influence of Ketoaldehyde Derivatives of Biphenyl on the Dynamics of Viral Infections in Monolayer all cultures I–II–III. On the Activity of Xenalamine on the Dynamics of Infection by Type I (Brunhilde) Poliomyelitis and Measles Virus [Edmonston Strain]," Boll. Soc. Ital. Biol. Sper., vol. 36, pp. 1432–1437, Dec. 31, 1960.

Magni: "Action of a Recent Synthetic Antiviral Agent (Xenalamine) in the Therapy and Prevention of Some Diseases in the Pediatric Age. Therapy of Influenza; Therapeutic and Preventive Action in Measles and Chickenpox," Minerva Med., vol. 52, pp. 2760–2770, Aug. 18, 1961.

Coraggio et al.; "Activity of Xenalamine on Infection by Type 5–6–8 Adenovirus in Tissue Culture," Boll. Soc. Ital. Biol. Sper., vol. 36, pp. 767–768, Aug. 15, 1960.

Musser et al.: "Studies on Measles Virus II. Physical Properties and Inactivation Studies of Measles Virus," J. Immun., vol. 85, pp. 292–297, September 1960.